United States Patent Office 3,337,508
Patented Aug. 22, 1967

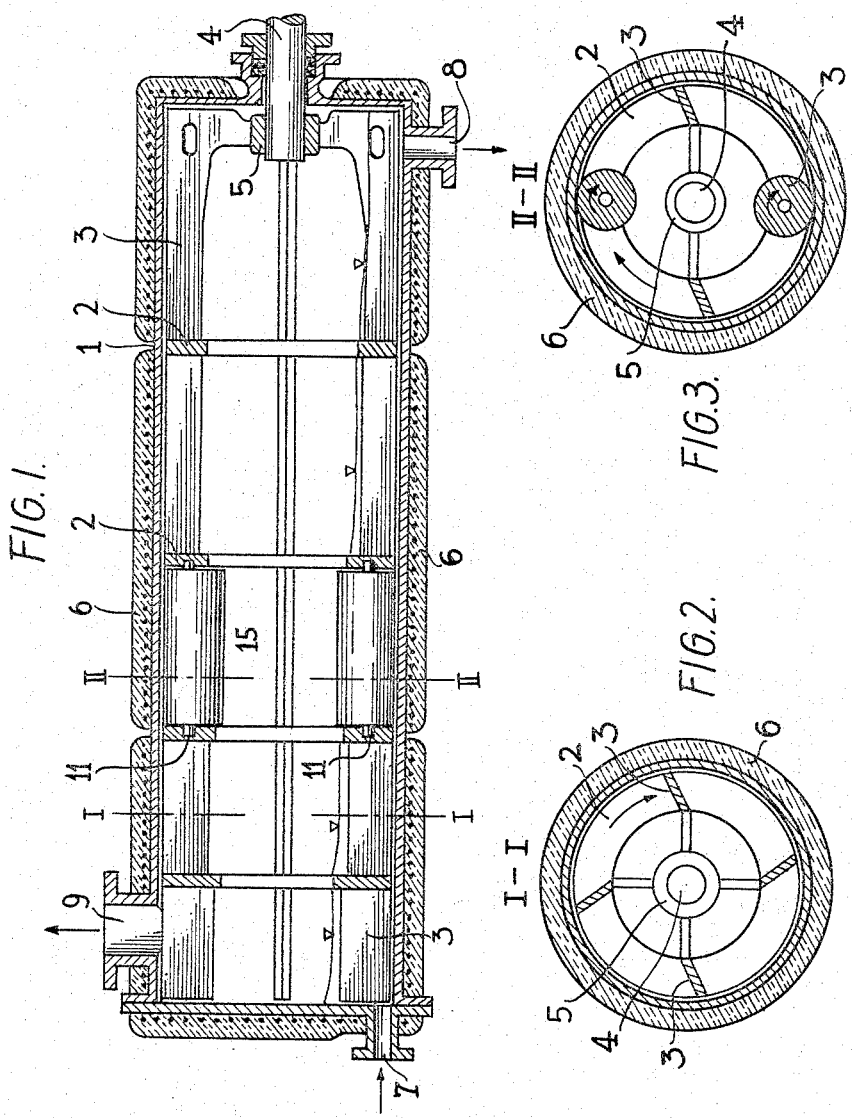

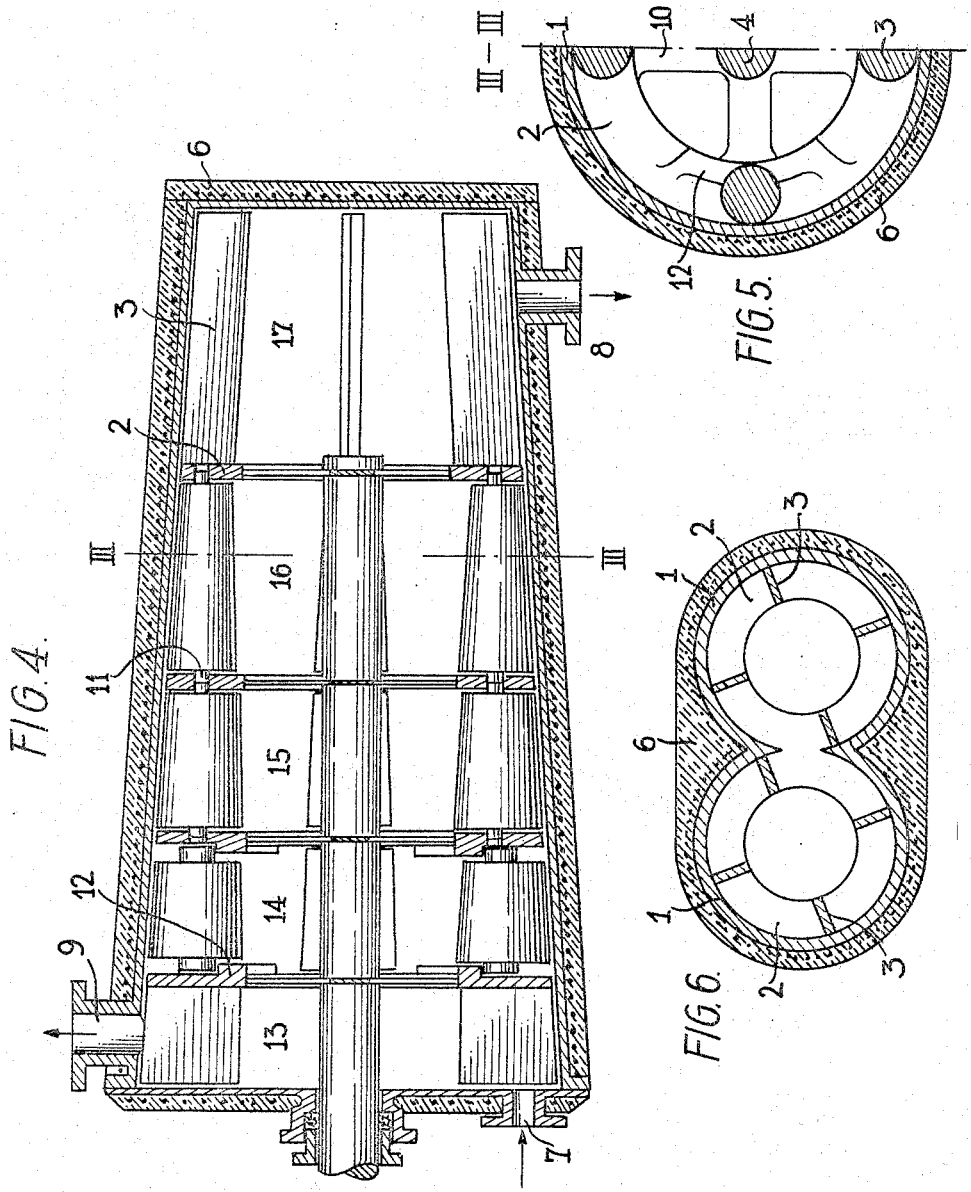

3,337,508
PROCESS FOR CONTINUOUS PREPARATION OF CONDENSATION POLYMERS
Ditmar Bachmann, Hofheim, Taunus, and Helmut Gerstenberg, Karlheinz Grafen, and Emmerich Pászthory, Frankfurt am Main, Germany, assignors to Farbwerke Hoechst Aktiengesellschaft vormals Meister Lucius & Brüning, Frankfurt am Main, Germany, a corporation of Germany
Filed Jan. 29, 1963, Ser. No. 254,812
Claims priority, application Germany, Feb. 2, 1962, F 35,903
6 Claims. (Cl. 260—75)

The invention relates to the manufacture of polycondensation products, especially to a continuous process for the manufacture of linear saturated and unsaturated polyesters, polyethers and polyamides and to an apparatus for carrying out said process.

It has already been described to supply heat to a reaction mixture in order to initiate and continue a polycondensation reaction and to subject the mixture simultaneously to a reduced pressure and the action of a stirring means. Processes of this kind are generally carried out in batches in stirring vessels having a useful capacity of 5 to 10 cu. m. The polycondensation process carried out in batches is still imperfect due to the thermal and rheological properties of the reaction mixture. The heat conductivity of the mixture which is generally low and the viscosity which increases with the proceeding polycondensation, inhibit a uniform heating up and mixture, which leads to products having a non-uniform polycondensation degree. There must also be considered the disadvantages generally incurred in batchwise production as compared with continuous production which consist in a non-uniform quality of the individual batches obtained in respect to one another.

There are also known processes which proceed continuously. In these known continuous processes the aforementioned low heat conductivity and the flowability of the mixture which deteriorates during the polycondensation process prevent to an even higher extent the formation of a product having a high degree of polymerization and the required uniformity. Inasmuch as the mixture is exclusively conveyed under the influence of gravity in these processes, as is the case in column- or falling-film apparatus, a particularly low limit is set to the condensation degree, which limit is often attained already with viscosities of the order of 80 poises.

When using apparatus in which the conveyance of the mixture is enforced in a special manner by mechanical means such as screw conveyors, rollers or other means of conveyance, the resistance to shearing in the mixture and the adhesion forces which exhibit a retarding action can be overcome more easily, but undesirable non-uniformities in the mixture and local overheatings cannot be avoided. According to experience, inhomogeneities that have once been formed in the course of these processes can be the less compensated the more rigorously the mixture is conveyed.

In screw apparatus resembling extruders a thin layer of the mixture is formed corresponding to the radial clearance between the crest of the screw and the wall of the barrel used as heating surface; the layer between the core of the screw and the wall of the barrel, however, is much thicker. Accordingly, there is a risk that the layers near to the barrel are overheated on account of the low heat conductivity of the mixture or that the portions of the mixture near to the core are insufficiently heated. The weak mixing effect of the screw is not capable of compensating for these different conditions. Even the use of rollers whose effective surface carries out a relative movement to the wall of the casing or barrel entails considerable disadvantages. In the case of a wide gap between the casing and the roller the mixing effect is insignificant. In the case of a relatively narrow gap on all sides a better mixing effect is obtained, but then the surface used for deaeration is more or less insufficient.

In known processes in which other mechanical means, such as scrapers, are used in order to convey the total stream of the mixture in a very thin layer in one passage across the heating surface, there exists great sensitivity to temperature fluctuations so that deviations, which are within the range of the accuracy of automatically controlled heating systems, lead to undesired by-products. Also the scrapers cause the formation of such by-products. Considerable portions of the mixture—as compared to the low content of the mixture in the apparatus—adhere to the scrapers, which portions are smeared again and again against the heating surface and are rapidly decomposed.

Now we have found a process for the manufacture of polycondensation products on an industrial scale which process avoids the disadvantages described above.

The solution of the problem consists in a process for a continuous polycondensation in which, according to the invention, portions of the melt are continuously drawn off from the separate stages of a melt dammed several times in a bed, which portions are spread on the section of the heating surface pertaining to each damming stage, fed back to the damming stage where they are mixed with the melt.

The melt-stream is time and again disturbed as well as mixed intimately by means of the partial streams of the melt drawn off and conveyed across the separate stages of the dammed melt under the push of the inflowing mass. In this process it is advantageous to expose the melt to rising temperatures as the polycondensation proceeds.

The adjustment to the proceeding degree of polycondensation can even be improved by damming the melt stagewise in several beds in succession and exposing the melt to falling pressures and rising temperatures according to the proceeding polycondensation. The pressures may be graded, for example, from bed to bed according to a geometrical progression, while the temperatures may rise on a linear scale in the direction of the flow.

Variation of the thickness of the layer constitutes another possibility of adjustment; thus the portions of the melt drawn off from the first damming stage can be applied and spread in thin layers, while those of the following stages can be applied and spread in relatively thick layers. Finally also the depth and breadth of the damming stages or the amount of the melt contained therein may be graded, for example for attaining a certain duration of the residence time.

The process according to the invention assures a satisfactory space-, surface- and time-yield. The layers of the product on the heating surfaces are constantly renewed in order to avoid overheatings and always mixed again thoroughly with the contents of the stages which dam the melt. Due to bubbling over when being mixed, part of the melt also flows into the adjacent stages. However, the mixture flowing in can by no means intermingle directly with the melt flowing out. Thus a product of a high homogeneity and quality is obtained.

The apparatus used for carrying through the process of the invention consists of a vacuum tight casing having a cylindrical or conical shape which can be heated on all sides and which is preferably disposed horizontally and contains annular damming elements which divide the casing into several damming chambers which communicate with one another and/or with a driving shaft via distributing-, spreading- and scraping-devices.

The method and apparatus of this invention are described by way of example with reference to the accompanying drawings. FIG. 1 is a sectional view of the longitudinal axis, FIGS. 2 and 3 correspond to the cross sections pertaining thereto in planes I—I and II—II. FIG. 4 is a modification of the apparatus; FIG. 5 is a cross section in the plane III—III. FIG. 6 shows two parallelly switched apparatus.

FIG. 1 shows in which manner annular damming elements 2 in a horizontally disposed cylindrical casing 1 communicate with one another or with a driving shaft 4 via blade-shaped distributing-, spreading- and scraping-devices 3. The communicating blades may be disposed radially; however, as shown most clearly in FIG. 2, they may also be inclined towards a tangent line to the damming elements at the extremity of the blades. The driving shaft 4 consists in this modification only of a stump to which four blades 3 are fitted via a hub 5. On driving the shaft, hub 5, blades 3 and the annular damming elements 2 are carried along. The casing 1 is surrounded by a heating jacket 6 which is divided into several sections.

The heating installation or the heating jacket can be operated by means of vapor or a liquid heat transmitting agent. However, it is suitable to provide electric heating which can easily be subdivided into individual sections which can be operated independently of one another. Each damming chamber, for example, may be provided with a heating section (FIG. 4). However, several adjacent damming chambers may also be combined to form one heating group (FIG. 1).

The annular damming elements 2 can be disposed such that they divide the casing into several chambers of equal length; it is more advisable, however, that the chambers graduate with respect to their length in a manner such that the length of the chambers increases from inlet 7 to outlet 8. The external diameter of the damming elements 2 should only have little radial clearance with respect to the wall of the casing in order to obtain a good damming effect. The internal diameter of the damming elements may be of the same size. A damming effect which distinctly graduates in the direction of the outlet 8 is achieved with greater certainty when the internal diameters of the annular damming elements increase in size towards the outlet. An outlet 9 is provided for evacuation of vapor from the polycondensate.

The distributing-, spreading- and scraping blades 3 of a chamber are suitably disposed such that, according to their function, they have different radial clearances with respect to the wall of the casing. In addition to a good mixing effect in the damming chamber there is obtained in this manner an additional mixing effect on the wall of the casing. Thus the radial clearance of the spreading blades in the last chambers may be wider than the radial clearance in the first chambers in order to attain increasing heights of layers. Only the blades used as scrapers have the smal small radial clearance with respect to the wall.

For distributing and spreading the melt there may, instead of blades, suitably be disposed rollers which are pivoted or guided in the damming elements 2. To illustrate such an arrangement a pair of rollers has been marked in the central chamber (FIGS. 1 and 3). It is shown how the rollers 3 are revolved in bores 11 of the damming elements 2; the shafts of said rollers do not move relatively to the blades communicating with the damming elements. However, the rollers can also be revolved in bars 12 of the damming elements 2 (FIGS. 4 and 5).

In casings having a conical shape, the rollers must also have a conical shape so that the jacket thereof retains a uniform radial clearance with respect to the wall. Such modifications are shown, among others, in FIGS. 4 and 5. Distributing devices 3 in the form of rollers pertaining to damming chambers 15 and 16 are pivoted in bores 11 of the damming elements 2, those pertaining to chamber 14 are pivoted in beds 12. Chambers 13 and 17 are only provided with blade-shaped distributing devices. FIGS. 4 and 5 only show the different types of distributing- and spreading-devices side by side for the purpose of comparison. In practice the chambers are suitably provided with distributing-, spreading- and scraping-devices of the same design, for example with blades and rollers situated in pairs with respect to one another in each chamber.

Depending on the radial clearance and the angle to the wall of the casing, the blades may have different functions, for example blades which practically have no radial clearance are used as scrapers, while blades having a wider radial clearance are used as distributors, spreaders or scoops. By arranging the blades in an inclined position the function designed to them can be improved; blades inclined in a forward position improve the scraping- and mixing-effect, while blades inclined in a backward position improve the scooping- and distributing-effect.

To carry through the process according to the invention a plurality of devices of the type described above can be connected in series. However, it is also possible that several devices operate parallelly; for example, two shafts each provided with damming elements 2 as well as distributing-, spreading- and scraping-devices 3 may be installed in one casing 1. Such a connection is shown in FIG. 6.

The following example serves to illustrate the invention, but it is not intended to limit it thereto:

*Example*

Polyethylene terephthalate which already had a viscosity of 40 poises and was obtained in a mass flow of 100 kg./h. at a temperature of 275° C., was to be processed to a higher degree of polycondensation.

With the use of an apparatus of the type described above the casing of which had a length of 1.5 m., a diameter of 0.8 m. and which was provided with four damming elements, the melt obtained was dammed five times in the casing. The internal diameters of the annular damming elements were graded uniformly between 400 and 500 mm. Portions of the melt were drawn off from the melt at each damming stage and distributed and spread on the heating sections pertaining thereto by means of blades, fed back into the damming stage and mixed with the melt. The shaft with the damming elements and the blades rotated 16 times/minute. The working pressure in the casing was 0.5 mm. of mercury. The residence time of the melt in the casing was 180 minutes. The polycondensation product drawn off had a temperature of 280° C. and a viscosity of 10,000 poises. Two kg./h. of ethylene glycol were obtained at the same time in the vapor state.

We claim:
1. In a process for continuous polycondensation of a melt of a linear saturated or unsaturated polyester, polyether or polyamide by heating the melt under reduced pressure, the improvement which comprises continuously feeding the melt into and through a plurality of successive heating stages provided with intermediate damming means, spreading a portion of the melt in each heating stage in the form of a layer on a heated surface for heating said portion under reduced pressure, continuously returning said heated portion of the melt in each stage from said heated surface to the melt in said stage for admixture therewith, and feeding said mixture over said intermediate damming means until it is continuously withdrawn from the last heating stage.

2. The process as defined in claim 1 wherein the melt is a melt of polyethylene terephthalate.

3. The process as defined in claim 1 wherein the layer of melt spread in each heating stage is substantially horizontal.

4. The process as defined in claim 1 wherein the layer of melt is exposed to increasing temperatures as the polycondensation proceeds.

5. The process as defined in claim 1 wherein the layer of melt is exposed to increasingly reduced pressure as the polycondensation proceeds.

6. The process as defined in claim 1 wherein the thickness of the layer of melt increases as the polycondensation proceeds.

References Cited
UNITED STATES PATENTS

| | | | |
|---|---|---|---|
| 2,964,391 | 12/1960 | Benson | 260—75 |
| 2,992,679 | 7/1961 | Twaddle | 159—2 |
| 3,082,816 | 3/1963 | Skidmore | 159—2 |
| 3,118,739 | 1/1964 | Atkinson et al. | 23—285 |
| 3,127,376 | 3/1964 | Lindenauer et al. | 260—75 |
| 3,167,531 | 1/1965 | Parker et al. | 260—75 |

WILLIAM H. SHORT, *Primary Examiner.*

C. A. WENDEL, H. D. ANDERSON,
*Assistant Examiners.*